Figure 1:
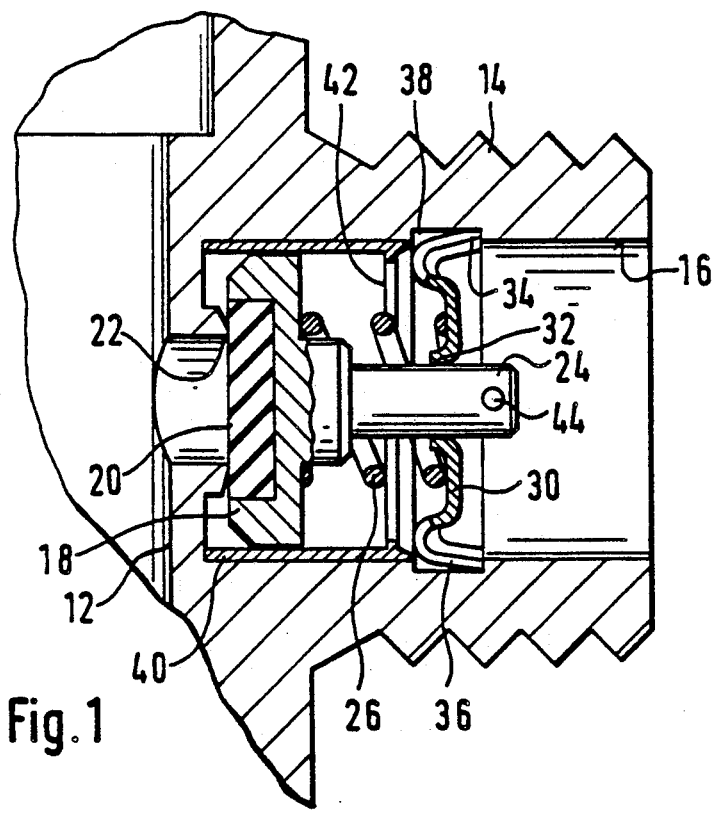

United States Patent [19]

Kremer

[11] Patent Number: 4,993,451
[45] Date of Patent: Feb. 19, 1991

[54] VALVE FOR GAS CYLINDERS

[75] Inventor: Paul Kremer, Walferdange, Fed. Rep. of Germany

[73] Assignee: Ceodeuz S.A., Lintgen, Luxembourg

[21] Appl. No.: 454,376

[22] Filed: Dec. 21, 1989

[30] Foreign Application Priority Data

Dec. 23, 1988 [LU] Luxembourg ............... 87413

[51] Int. Cl.$^5$ ............................................. F16K 15/02
[52] U.S. Cl. .................. 137/454.2; 137/543; 251/357
[58] Field of Search ............... 137/454.2, 542, 543; 251/357

[56] References Cited

U.S. PATENT DOCUMENTS

| 4,372,343 | 2/1983 | Trinkwalder, Jr. | 137/614.2 |
| 4,532,958 | 8/1985 | Napolitano | 137/454.2 |
| 4,535,808 | 8/1985 | Johanson | 251/337 X |
| 4,543,988 | 10/1985 | Huveteau | 251/337 X |
| 4,706,929 | 11/1987 | Kalaskie et al. | 251/14 |

FOREIGN PATENT DOCUMENTS 2909046  3/1980  Fed. Rep. of Germany .
633979   6/1963  France .
82/03900 11/1982 PCT Int'l Appl. .

Primary Examiner—Robert G. Nilson
Attorney, Agent, or Firm—Leydig, Voit & Mayer

[57] ABSTRACT

The valve is intended to contain a given residual pressure in the cylinder and is mounted in the cylindrical bore (16) of a connection piece (14) designed to be connected either to a circuit for using the gas, or to a circuit for filling or rinsing the cylinder. It comprises a closing member which is urged in the direction of its closure onto a seat (22) under the action of a spring (26) and counter to the action of the pressure of the gas in the cylinder. In order to permit the filling of the cylinder, the closing member is axially displaceable inside a bush (40) which is removably engaged in the said bore (16) while the spring (26) rests on an element designed to be secured either to the connection pieces (14) so as to keep the valve in the operative position, or to the said bush (40) so as to permit the axial disengagement of the valve together with the bush (40) and the said element.

9 Claims, 1 Drawing Sheet

VALVE FOR GAS CYLINDERS

The present invention relates to a valve for gas cylinders which is intended to contain a given residual pressure in the cylinder and is mounted in the cylindrical bore of a connection piece designed to be connected either to a circuit for using the gas, or to a circuit for rinsing or filling the cylinder, the said valve comprising a closing member which is urged in the direction of its closure onto a seat under the action of a spring and counter to the action of the pressure of the gas in the cylinder.

Although not limited thereto, the invention is aimed more particularly at cylinders containing liquefied or compressed gases which are used, for example, in the manufacture of optical fibres or in the technology of semiconductors, in particular for doping the latter. These gases have to be almost totally pure since the slightest impurity, solid, liquid or gaseous, however microscopic it may be, can disrupt the doping and manufacturing process of these materials. In addition, these gases may be corrosive, even toxic.

In order to prevent the penetration of impurities into the empty cylinders, which would be difficult to remove by rinsing prior to refilling the cylinder, the cylinders are not emptied completely so as to maintain a residual pressure therein which prevents the penetration of such impurities. To this end, there is provided in the outlet connection piece of the gas cylinders a valve of the type described above, which closes automatically under the action of its spring when the pressure of the gases in the cylinder falls below a predetermined value. However, such a valve prevents the rinsing or filling of the cylinder, since these operations are carried out through this same connection piece and the pressure of the gas having to penetrate into the cylinder urges the valve in the direction of its closure. In order to overcome this, various, more or less complicated systems have been provided which make it possible either to lock this valve in an open position counter to the action of its spring, or to provide a valve having a differential action, which means that the pressure of the gas at the inlet is transmitted to the opposite side and that different active surfaces are utilized to displace the valve counter to the pressure of the gas which urges it.

The object of the present invention is to provide a valve of this type which is characterized by its simplicity, its reliability and its cost price and which interferes neither with the rinsing nor with the filling of a cylinder.

In order to achieve this objective, the valve proposed by the present invention is characterized, in its preferred embodiment, in that the closing member is axially displaceable inside a bush which is removably engaged in the said bore, and in that the said spring rests on an element designed to be secured either to the connection piece so as to keep the valve in the operative position, or to the said bush so as to permit the axial disengagement of the valve together with the bush and the said element.

In other words, for the purpose of rinsing or filling the cylinder, a simple manual operation is sufficient, without the need for tools, to remove the entire valve and its accessories and to free completely the inlet connection piece inside the cylinder.

According to an advantageous embodiment, the said element consists of a disc, the peripheral edge of which is urged elastically and radially outwards so as to rest either on the edge of an inner circular groove of the said bore, in order to keep the valve in the operative position, or, under the action of a manual depression, behind an inner projecting edge of the bush.

The closing member is preferably designed in the form of a piston, the head of which is formed by the sealing member and the opposite side of which is extended axially by a rod through the spring urging the piston.

The said element may be designed in the form of a disc which is capable of sliding axially on the piston rod and the peripheral part of which has radial undercuts for defining petals which are curved in the outer axial direction so as to exhibit elastic flexibility in the radial direction.

Figure 2:
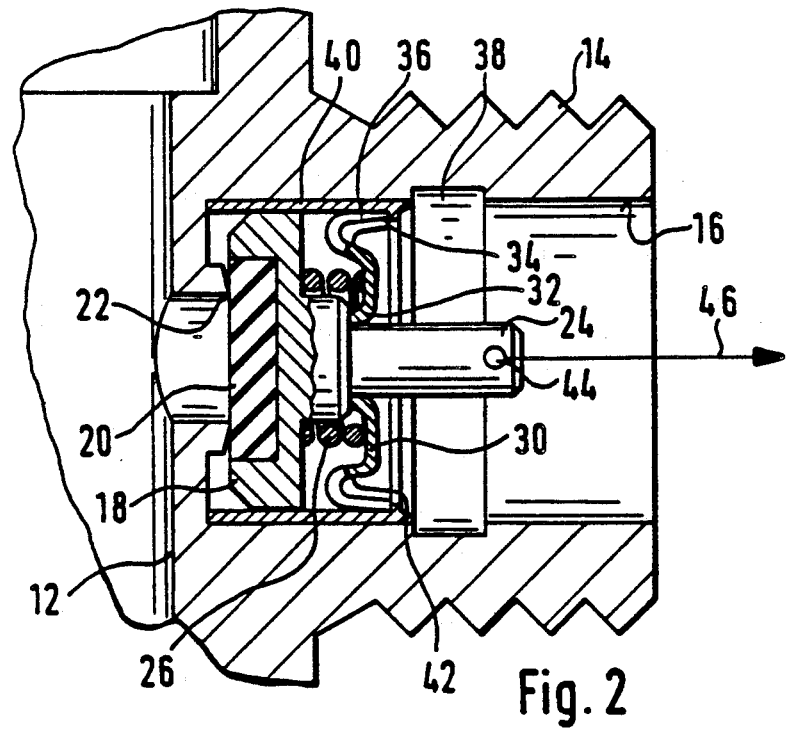

Other features and characteristics will emerge from the detailed description of an advantageous embodiment, presented below by way of illustration, with reference to the accompanying drawings, in which:

FIG. 1 shows diagrammatically an axial vertical section through a valve according to the present invention, in the operative position, and FIG. 2 a similar view of the same valve, in the inoperative position before its disengagement.

In the figures, the reference numeral 10 shows a part of the head of a gas cylinder which has a main passage 12, in which the tap (not shown) for opening and closing the cylinder is situated. The reference numeral 14 shows a connection piece with an external thread which permits the connection of the cylinder either to a utilization circuit or to a circuit for rinsing or filling the cylinder.

In order to prevent the gas cylinder from being emptied beyond a predetermined residual pressure, a valve is provided in the cylindrical bore 16 of the connection piece 14, which valve closes automatically when this pressure is reached. In the embodiment shown, this valve consists of a piston 18 which is capable of sliding axially in this bore 16 and the front surface of which carries a sealing cap 20 cooperating with an annular seat 22 around an opening communicating with the main passage 12. The side of the piston 18 opposite the cap 20 is extended by a rod 24, around which is mounted a helical spring 26 which tends to keep the piston 18 on its seat 22. The force of this spring 26 is determined so as to correspond substantially with the force of the residual pressure which it is desired to maintain in the cylinder and which acts on the sealing surface of the piston 18 counter to the action of the spring 26. When the pressure of the gas in the cylinder is greater than this residual pressure, the thrust which it exerts on the valve is sufficient to keep it open counter to the action of the spring 26. In contrast, when the cylinder becomes empty and the pressure of the gas falls below the threshold of this residual pressure, the force of the spring 26 becomes greater than the thrust of the gas, thereby permitting it to push back the piston 18 onto its seat 22 and to keep it there.

In order to be able to rinse the cylinder and fill it through the connection piece 14, the present invention provides a simple and efficient system for rapidly demounting the entire valve. To this end, the spring 26 rests, on the side opposite the valve piston 18, on a disc 30 which is engaged on the rod 24 and which is capable of sliding axially relative to this rod 24 and vice versa. This disc 30 has, in diametral section, the form of a brace, that is to say its central edge 32 around the opening for the passage of the rod 24 is curved axially in the direction of the piston 18 so as to ensure better guidance on the rod 24, while its outer circular edge 34, after an axial curvature in the direction of the piston 18, is curved axially on the opposite side, that is to say towards the outside of the connection piece 14. This form of the disc 30 gives it a radial elasticity which keeps the edge 34 against the wall of the bore 16. In order to improve this elasticity, the disc 30 has, in addition, peripheral undercuts which define a series of petals 36 which lean elastically against the inner wall of the bore 16.

The bore 16 of the connection piece 14 has a circular groove 38 which defines the operative position of the disc 30. In fact, by virtue of the radial elasticity of the petals 36, the edge 34 of the latter is engaged behind the outer edge of this groove 38, as shown in FIG. 1. The disc 30 cannot therefore come off under the action of the thrust of the spring 26.

Situated around the piston 18 is a cylindrical bush 40 which is engaged freely, by sliding in the bore 16, and which extends as far as the inner edge of the groove 38. This bush 40 has, on the side of the groove 38 and on the inside, a circular rib 42 projecting relative to its inner surface. Besides the role which it plays during the disengagement of the valve, this rib 42 can serve as a stop for the piston 18 in order to delimit its open position.

The functioning of the valve according to the present invention emerges from the comparison of FIGS. 1 and 2. FIG. 1 shows the valve in the operative position and in the closed position, which means that the pressure of the gas in the cylinder has fallen below the threshold of the residual pressure and that the cylinder is almost empty. In order to be able to rinse the cylinder with the aid of an inert gas and then to refill it, the valve is simply demounted. To this end, the disc 30 is depressed manually, or with the aid of a bush, counter to the action of the spring 26 by pushing on its plane median part. This depression of the disc 30 is made possible by virtue of the radial flexibility of its petals 36 which permit its penetration into the bush 40 and its passage through the rib 42 until the edge 34 is caught behind the rib 42, as shown in FIG. 2. From this position, the valve can be disengaged easily together with the bush 40, in the direction of the arrow 46 in FIG. 2, either by simply pulling or under the action of the thrust exerted by the residual pressure of the gases if this is sufficient. In order to prevent, during the removal of the valve, the release of the spring 26 from causing a total disengagement of the disc from the rod 24, it is possible to provide on the latter a diametral stop 44.

For the purpose of fitting the valve, it is sufficient to engage the latter together with the bush 40 until it occupies the position according to FIG. 1. The moment when this position is reached is easily perceptible as a result of the click which is produced when the petals 36 expand elastically in the groove 38.

Although the valve described above has been designed in its preferred embodiment to permit the filling of a gas cylinder, it can also be used to prevent the filling of a gas cylinder. In fact, cylinders exist which can be used only once and which may not be refilled, for example for safety reasons. In order to make it impossible for a cylinder to be nevertheless refilled contrary to these instructions, it is sufficient to equip them with a valve as described above with the exception of the bush 40 which permits the drawing-in of the claws formed by the petals of the disc 30. In other words, if the bush is not present, it is possible to engage the valve, but once the disc 30 is lodged in the groove 38, it is very difficult, even impossible, to dislodge it, which prevents filling.

According to a variant, a complete demounting of the valve is not even necessary for the purpose of filling the cylinder. It is sufficient, in fact, with the aid of suitable pliers engaged on the stop 44, to pull the rod 24 counter to the action of the spring 26 in the position of FIG. 1 and to keep it in an open position either with the aid of the pliers, or with the aid of other suitable means until the end of the filling operation.

I claim:

1. Valve for gas cylinders which is intended to contain a given residual pressure in the cylinder and is mounted in a cylindrical bore (16) of a connection piece (14) designed to be connected either to a circuit for using the gas, or to a circuit for filling or rinsing the cylinder, the said valve comprising a closing member which is urged in the direction of its closure onto a seat (22) under the action of a spring (26) and counter to the action of the pressure of the gas in the cylinder, characterized in that the closing is axially displaceable inside a bush (40) which is removably engaged in the said bore (16), and in that the said spring (26) rests on an element designed to be secured either to the connection piece (14) so as to keep the valve in the operative position, or to the said bush (40) so as to permit the axial disengagement of the valve together with the bush (40) and the said element.

2. Valve according to claim 1, characterized in that the said element consists of a disc (30), the peripheral edge (34) of which is urged elastically and radially outwards so as to rest either on the edge of an inner circular groove (38) of the said bore (16), in order to keep the valve in the operative position, or, under the action of a manual depression, behind an inner projecting edge (42) of the bush (40).

3. Valve according to claim 1, characterized in that the closing member is designed in the form of a piston (18), the head of which is formed by a sealing cap (20) and the opposite side of which is extended axially by a rod (24) through the spring (26) urging the piston (18).

4. Valve according to claim 1, characterized in that the said element is in the form of a disc (30) which is capable of sliding axially on a piston rod (24) and the peripheral part of which has radial undercuts for defining petals (36) which are curved in the outer axial direction so as to exhibit elastic flexibility in the radial direction.

5. Valve according to claim 4, characterized in that the disc (30) has a central opening, via which it is engaged on the piston rod (24), the edge of this opening being curved axially in the opposite direction to the petals (36).

6. Valve according to claim 4, characterized in that the free end of the piston rod (24) has a diametral stop to prevent the disc (30) from coming off the rod 24).

7. Valve according to claim 2, characterized in that the said disc 30 is capable of sliding axially on a piston rod, the peripheral part of said disc having radial undercuts for defining petals (36) which are curved in the outer axial direction so as to exhibit elastic flexibility in the radial direction.

8. Valve according to claim 7, characterized in that the disc (30) has a central opening, via which it is engaged on the piston rod (24), the edge of this opening being curved axially in the opposite direction to the petals (36).

9. Valve according to claim 7, characterized in that the free end of the piston rod (24) has a diametral stop to prevent the disc (30) from coming off the rod (24).

* * * * *